US008069013B2

(12) United States Patent
Hotton et al.

(10) Patent No.: US 8,069,013 B2
(45) Date of Patent: Nov. 29, 2011

(54) WATER HEATER MONITOR/DIAGNOSTIC DISPLAY APPARATUS

(75) Inventors: Bruce A. Hotton, Seven Fields, PA (US); Troy E. Trant, Montgomery, AL (US); Jozef Boros, Montgomery, AL (US); Walter T. Castleberry, Hampton Cove, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 12/760,785

(22) Filed: Apr. 15, 2010

(65) Prior Publication Data

US 2010/0193593 A1 Aug. 5, 2010

Related U.S. Application Data

(62) Division of application No. 12/013,773, filed on Jan. 14, 2008, now Pat. No. 7,818,095.

(60) Provisional application No. 60/899,671, filed on Feb. 6, 2007.

(51) Int. Cl.

| | |
|---|---|
| ***G05B 15/00*** | (2006.01) |
| ***G06F 19/00*** | (2006.01) |
| ***G06F 17/40*** | (2006.01) |

(52) U.S. Cl. ...... 702/182; 73/866.3; 165/11.1; 340/603; 340/679; 374/1; 700/299; 700/300; 702/187; 702/189

(58) Field of Classification Search .................. 73/1.01, 73/432.1, 865.8, 865.9, 866.3; 122/4 R, 122/4 A, 13.01, 14.1, 14.2, 14.21, 14.22, 122/17.1, 18.5, 19.1, 19.2, 448.1; 126/344; 165/11.1, 200, 201, 253, 287; 210/143, 149, 210/175, 194, 200, 481, 482, 490, 492, 494, 210/496, 497; 236/20 R; 237/2 R, 2 B, 8 R, 237/8 A; 340/500, 540, 603, 679, 870.01, 340/870.07, 870.09, 870.16, 870.17; 374/1, 374/100, 101, 141; 392/441, 444, 447, 449, 392/451, 454, 463, 465, 478, 485, 494, 497; 700/1, 90, 299, 300, 306; 702/1, 33, 34, 702/85, 105, 127, 130, 136, 182, 183, 184, 702/187, 188, 189

See application file for complete search history.

(56) References Cited

U.S. PATENT DOCUMENTS 3,770,002 A 11/1973 Brown (Continued)

FOREIGN PATENT DOCUMENTS

JP 04-033616 A * 2/1992

(Continued)

OTHER PUBLICATIONS

"Springfield Precise Temp™—Wireless Multi-Zone Digital Thermometer (91049-1)," Springfield Precision Instruments, Inc., Wood-Ridge, NJ, brochure sheets (2 pages).

(Continued)

*Primary Examiner* — Edward Cosimano

(74) *Attorney, Agent, or Firm* — Haynes and Boone, LLP

(57) ABSTRACT

A water heater is provided with monitor/diagnostic display apparatus that selectively provides a user with visual or other type of indicia of the recovery time for the water heater. The apparatus includes a monitoring unit that may be mounted on the water heater, and a display unit that may be mounted either on the water heater or remotely therefrom.

18 Claims, 11 Drawing Sheets

U.S. PATENT DOCUMENTS

| | | | | |
|---|---|---|---|---|
| 4,317,987 | A | 3/1982 | Fieldman | |
| 4,413,775 | A | 11/1983 | Scott | |
| 4,568,821 | A * | 2/1986 | Boe | 219/419 |
| 4,665,292 | A * | 5/1987 | Payne | 219/448.12 |
| 4,924,404 | A | 5/1990 | Reinke, Jr. | |
| 4,948,948 | A | 8/1990 | Lesage | |
| 5,023,432 | A * | 6/1991 | Boykin et al. | 219/497 |
| 5,103,078 | A * | 4/1992 | Boykin et al. | 219/494 |
| 5,345,224 | A | 9/1994 | Brown | |
| 5,444,924 | A * | 8/1995 | Joslin et al. | 34/486 |
| 5,504,306 | A | 4/1996 | Russell et al. | |
| 5,571,007 | A | 11/1996 | Ishiguro et al. | |
| 6,002,114 | A | 12/1999 | Lee | |
| 6,129,284 | A | 10/2000 | Adams et al. | |
| 6,148,146 | A | 11/2000 | Poore et al. | |
| 6,212,894 | B1 | 4/2001 | Brown et al. | |
| 6,246,831 | B1 | 6/2001 | Seitz et al. | |
| 6,351,603 | B2 | 2/2002 | Waithe et al. | |
| RE37,745 | E | 6/2002 | Brandt et al. | |
| 6,445,880 | B1 | 9/2002 | Hollander et al. | |
| 6,606,968 | B2 | 8/2003 | Iwama et al. | |
| 6,633,726 | B2 | 10/2003 | Bradenbaugh | |
| 6,658,372 | B2 | 12/2003 | Abraham et al. | |
| 6,728,600 | B1 | 4/2004 | Contaldo et al. | |
| 6,766,771 | B1 | 7/2004 | Hotton | |
| 6,795,644 | B2 | 9/2004 | Bradenbaugh | |
| 6,835,307 | B2 | 12/2004 | Talbert et al. | |
| 6,934,862 | B2 | 8/2005 | Sharood et al. | |
| 7,000,849 | B2 | 2/2006 | Ashworth et al. | |
| 7,020,543 | B1 | 3/2006 | Jaeschke et al. | |
| 7,065,431 | B2 | 6/2006 | Patterson et al. | |
| 7,167,813 | B2 | 1/2007 | Chian et al. | |
| 7,174,239 | B2 | 2/2007 | Butler et al. | |
| 7,188,002 | B2 | 3/2007 | Chapman, Jr. et al. | |
| 7,290,502 | B2 | 11/2007 | Kidd et al. | |
| 7,432,477 | B2 | 10/2008 | Teti | |
| 7,613,855 | B2 | 11/2009 | Phillips et al. | |
| 7,818,095 | B2 * | 10/2010 | Hotton et al. | 700/300 |
| 2008/0188995 | A1 * | 8/2008 | Hotton et al. | 700/300 |
| 2010/0204957 | A1 * | 8/2010 | Hotton et al. | 702/184 |

FOREIGN PATENT DOCUMENTS

| | | | |
|---|---|---|---|
| JP | 2001304690 | A | 10/2001 |

OTHER PUBLICATIONS

Patent Cooperation Treaty—U.S. International Searching Authority, PCT Notification of Transmittal of the International Search Report and the Written Opinion of the International Searching Authority, or the Declaration mailed Aug. 4, 2008, for corresponding PCT Application No. PCT/US08/52145, 10 pages.

Office Action mailed Apr. 7, 2010, in U.S. Appl. No. 12/013,773, filed Jan. 14, 2008.

* cited by examiner

WATER HEATER MONITOR/DIAGNOSTIC DISPLAY APPARATUS

CROSS-REFERENCE TO RELATED APPLICATION

This application is a division of U.S. application Ser. No. 12/013,733 filed Jan. 14, 2008, entitled "Water Heater Monitor/Diagnostic Display Apparatus", now U.S. Pat. No. 7,818,095, and claiming the benefit of the filing date of expired provisional U.S. patent application Ser. No. 60/899,671 filed Feb. 6, 2007. The entire disclosures of these prior applications are hereby incorporated herein in their entireties by this reference.

BACKGROUND OF THE INVENTION

The present invention generally relates to water heaters and, in a representatively illustrated embodiment thereof, more particularly relates to a water heater having incorporated therein specially designed monitor/diagnostic display apparatus useable to determine and display hot water availability, recovery time and efficiency information for the water heater.

Conventional water heaters, whether fuel-fired or electric, typically provide little in the way of user interface with the water heater. Accordingly, a need exists for improved water heater user interface, for example in the areas of providing a user with indicia of hot water availability, recovery time and overall water heater efficiency at any specific time. It is to this need that the present invention is primarily directed.

SUMMARY OF THE INVENTION

In carrying out principles of the present invention, in accordance with an illustrated representative embodiment thereof, the present invention provides specially designed electrically operable monitor/diagnostic display apparatus which may be operatively associated with either a fuel-fired or electric water heater to provide for a user of the water heater one or more useful diagnostic indicia informing the user of predetermined water heater operating characteristics and conditions. Representatively, the monitor/diagnostic display apparatus may be operative to display or otherwise inform the user of (1) the approximate remaining hot water availability of the water heater and/or (2) an estimated recovery time for the water heater and/or (3) a need for servicing the water heater.

More specifically, in a representatively illustrated embodiment thereof, the circuitry of the monitor/diagnostic display apparatus may be operative to display or otherwise inform the user of the approximate remaining hot water availability of the water heater at a given point in time by detecting the temperature of heated water in the water heater tank, and utilizing the detected water temperature to generate a signal indicating to the user an approximate total hot water availability of the water heater with a starting water delivery temperature equal to the detected temperature.

According to another aspect of the present invention, the circuitry of the monitor/diagnostic display apparatus may be operative to display or otherwise inform the user of an estimated water heater recovery time by determining, during heating of the water from a predetermined minimum temperature thereof to a set point temperature thereof, time periods required to respectively heat the water from each of a series of progressively lower temperatures to the next higher temperature in the series thereof; storing the determined time periods; detecting the temperature of heated water in the water heater tank; and utilizing the detected temperature and magnitude(s) of one or more of the stored time periods to generate a signal indicating to the user the estimated time for the water heater to recover from the detected water temperature to its setpoint water temperature.

According to a further aspect of the present invention, the circuitry of the monitor/diagnostic display apparatus may be operative to display or otherwise inform the user of the need to service the water heater due to a loss in recovery efficiency thereof by determining and storing the total recovery time of the water heater from a predetermined minimum water temperature thereof to a predetermined set point water temperature thereof, with the water heater in an initial condition thereof; subsequently determining the total recovery time for the water heater; comparing the subsequently determined recovery time to the initially determined recovery time; and generating a signal indicating to the user the need to service the water heater if the subsequently determined total recovery time is greater than the initially determined total recovery time by a predetermined factor. Additionally, the circuitry of the monitor/diagnostic display apparatus may be operative to disregard the determined successive time periods, and utilize a set of previously determined successive time periods, if the total of their time exceeds a predetermined total time.

DETAILED DESCRIPTION

Figure 1:
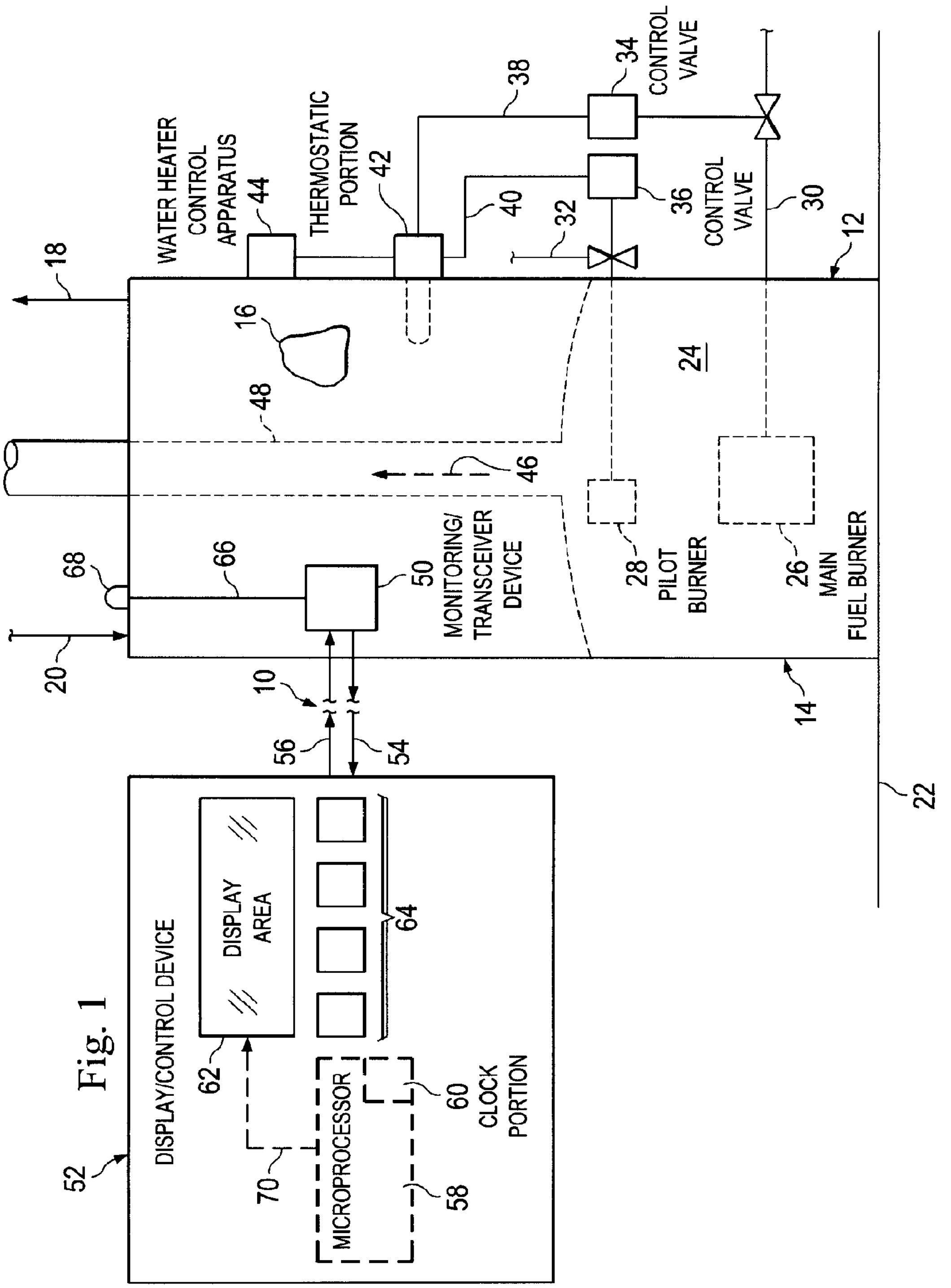
FIG. 1 schematically depicts a representative fuel-fired water heater having operatively associated therewith a specially designed monitor/diagnostic display apparatus embodying principles of the present invention.

Schematically depicted in FIG. 1 is a specially designed apparatus 10 for monitoring and displaying diagnostic information for a water heater, representatively a fuel-fired water heater 12. The water heater 12 is of a generally conventional construction and comprises an insulated tank 14 in which a quantity of pressurized, heated water 16 is stored for on-demand delivery to various plumbing fixtures, such as sinks, bathtubs, showers, dishwashers and the like, via a hot water supply line 18 connected to the top end of the tank 14. Heated water delivered to such fixtures via the line 18 is automatically replaced in the tank 14, from a suitable source of pressurized supply water, via a cold water inlet line 20 also connected to the top end of the tank 14. As illustrated, the water heater 12 rests on a floor area 22.

Tank 14 overlies a combustion chamber 24. A main fuel burner 26 and an associated pilot burner 28 are disposed within the combustion chamber 24 and are respectively supplied with fuel via fuel supply lines 30,32 having control valves 34,36 operatively interposed therein and controlled, via control lines 38,40 coupled to a thermostatic portion 42 of the main water heater control apparatus 44. Thermostatic portion 42 functions in a conventional manner to maintain the tank water temperature at a predetermined maximum set point temperature $T_{max}$, and the water heater 12 has a predetermined minimum temperature $T_{min}$. Illustratively, for the water heater 12, $T_{max}$ is 120° F. and $T_{min}$ is 90° F. However, other values of these two parameters could alternatively be selected if desired without departing from principles of the present invention. During firing of the main burner 26, hot combustion products 46 generated by the main burner 26 enter a flue pipe 48 extending upwardly from the combustion chamber 24 through the stored water 16 in the tank 14, with heat from the combustion products 46 being conducted through the flue 48 to the tank water 16.

The monitor/diagnostic display apparatus 10 includes a monitoring/transceiver device 50 externally mounted on the tank 14, and a display/control device 52 which is representatively disposed remotely from the water heater 12. Alternatively, the display/control device 52 could also be mounted on the tank 14 if desired. Devices 50,52 are electrically powerable either by line voltage or by batteries. Illustratively, as schematically depicted in FIG. 1, the devices 50 and 52 are operatively connected by electrical wires or cables 54,56 to allow communication between the devices 50,52 as subsequently described herein. Alternatively, the devices 50,52 could be wirelessly coupled to one another in a suitable known manner to permit communication therebetween. The display/control device 52 has a pre-programmed microprocessor 58 disposed therein and having a clock portion 60, a display area 62, and suitable control buttons 64 as required.

A water temperature sensing line 66 is operatively coupled at an inner end thereof to the monitoring/transceiver device 50, and has a temperature sensing device, illustratively a thermistor 68, disposed at its outer end and in thermal communication with the upper end of the tank 14 to indirectly detect or measure the temperature $T_{meas}$ of the water 16 therein and transmit a signal indicative of the temperature $T_{meas}$ to the device 50 via the sensing line 66. Alternatively, another type of sensor and/or sensor location could be utilized to directly or indirectly detect the temperature $T_{meas}$ of the water 16. A signal indicative of the water temperature $T_{meas}$ is transmitted from device 50 to the display/control device 52, wirelessly or via the wire or cable 56, for input to the microprocessor 58 which outputs a suitable signal 70 to the display 62 to create a diagnostic message therein as subsequently described herein. In turn, the display/control device 52 is operative to transmit to the monitoring/transceiver device 50, wirelessly or via the wire or cable 56, various control signals which may be used to adjust certain settings and functions of the water heater 12 (such as, for example, its set point temperature $T_{max}$) if desired.

The monitor/diagnostic display apparatus 10 is capable of performing three quite useful monitoring and diagnostic functions—namely:

(1) it can be used to monitor the temperature of the water 16 in the tank 14 and, utilizing the detected water temperature, generate a signal indicating to a user of the water heater 12 an estimated total hot water availability of the water heater 12 (defined as the total volume of available hot water above a predetermined minimum temperature $T_{min}$) with a starting water delivery temperature equal to the detected temperature;

(2) it can utilize water heater recovery time segments stored during an initial full recovery water heating process, together with detected tank water temperatures, to generate a signal indicating to a user of the water heater 12 an estimated time for the water heater 12 to recover from a detected water temperature to its maximum setpoint water temperature; and (3) it can compare an initial full water heater recovery time period to a subsequent full water heater recovery time period and responsively generate a signal indicating to a user of the water heater 12 the need to service the water heater 12 is the subsequently determined full recovery time is greater than the initially determined total recovery time by a predetermined factor.

Hot Water Availability Diagnostic Program

Figure 2A:
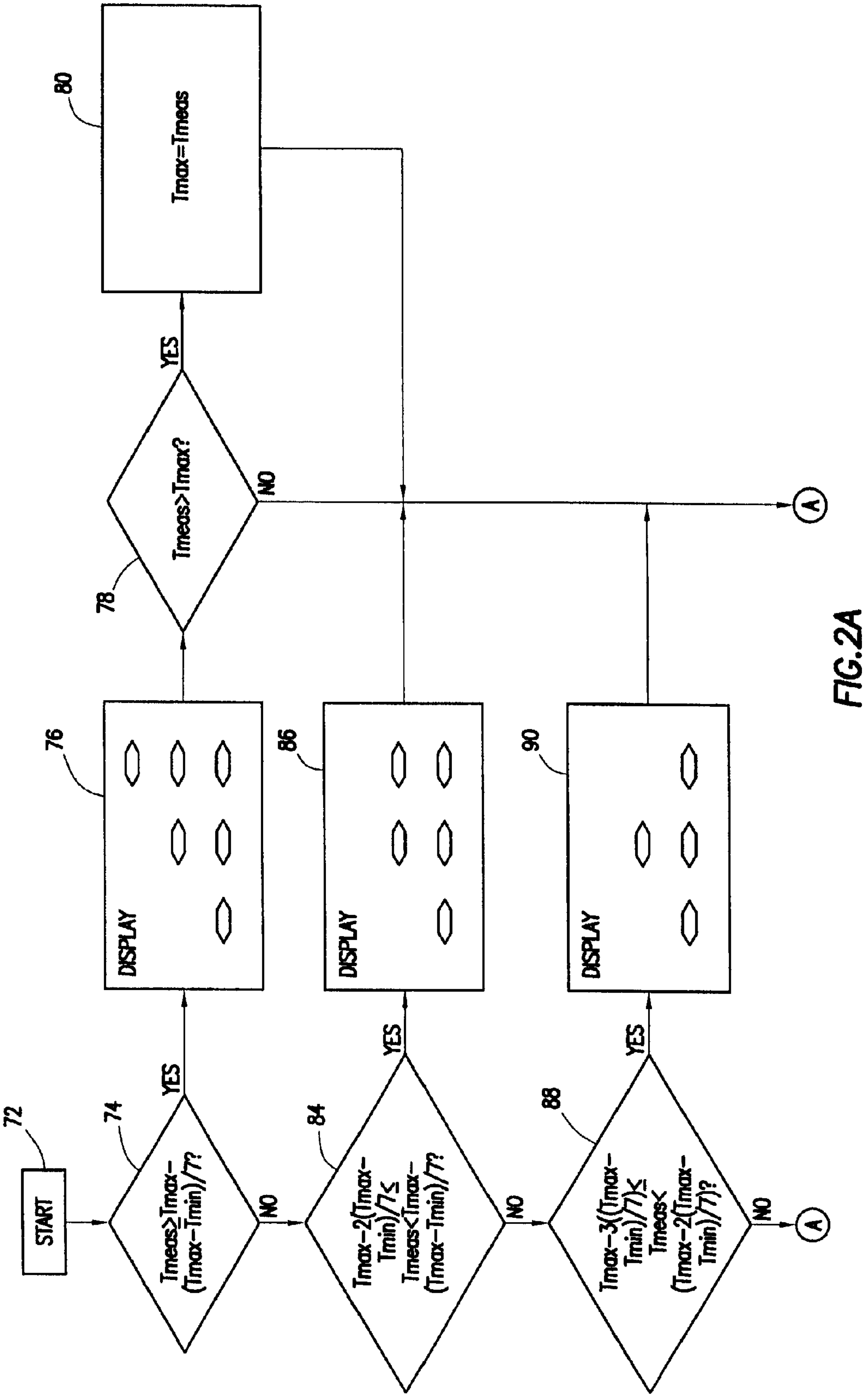
FIGS. 2A-2C collectively form a schematic flow diagram illustrating a method of determining and displaying hot water availability information for the water heater performable by the monitor/diagnostic display apparatus.
Figure 2B:
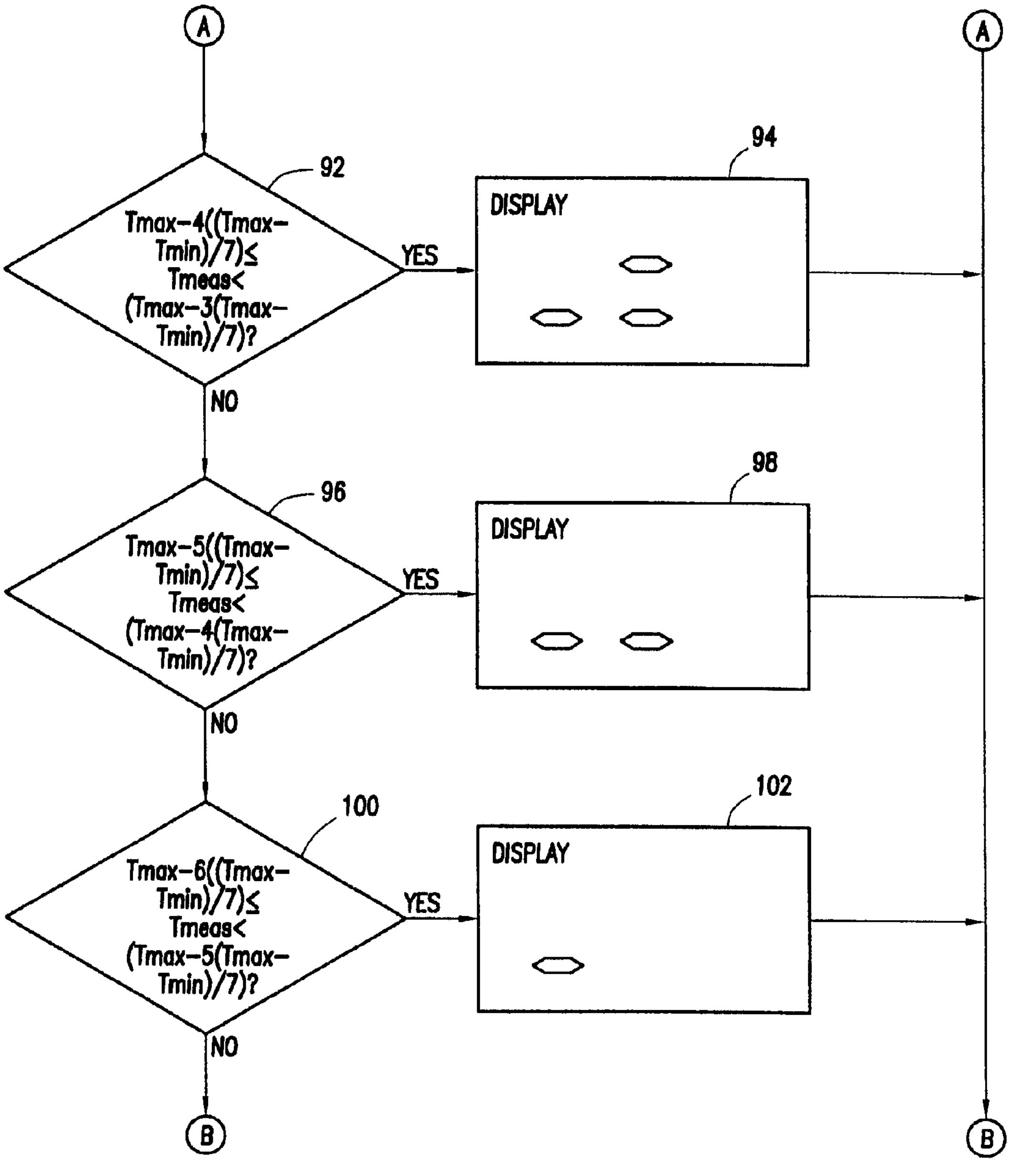
Figure 2C:
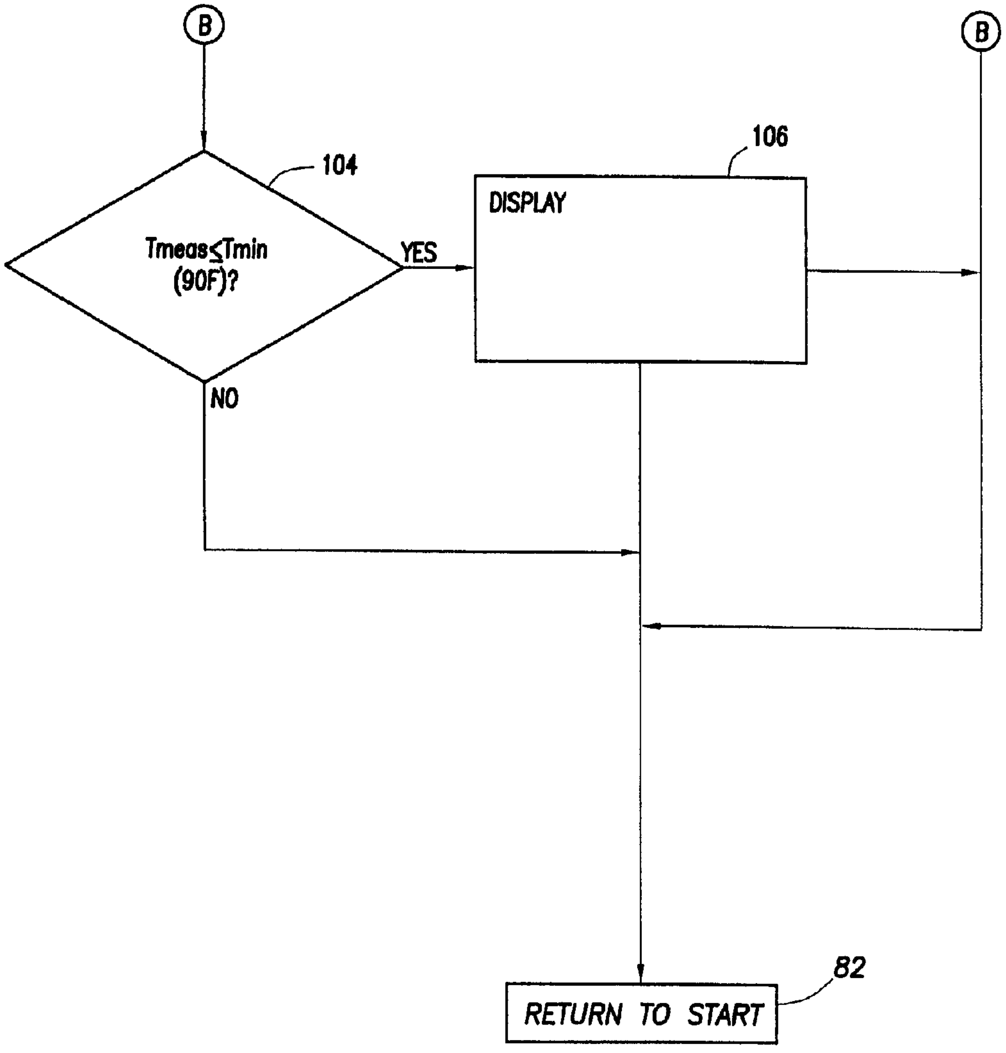

FIGS. 2A-2C collectively form a schematic flow diagram illustrating the determining and displaying hot water availability information for the water heater 12 performable by the monitor/diagnostic display apparatus 10, the steps for generating and displaying this information being pre-programmed into the microprocessor 58 (see FIG. 1). The left and right circled match points "A" in the FIG. 2A flow diagram segment respectively correspond to the left and right circled match points "A" in the FIG. 2B flow diagram segment, and the left and right circled match points "B" in the FIG. 2B flow diagram segment respectively correspond to the left and right circled match points "B" in the FIG. 2C flow diagram segment.

In response to starting the hot water availability diagnostic program using an appropriate one of the control buttons 64, as at step 72 (see FIG. 2A), a query is made at step 74 as to whether $T_{meas}$ is greater than or equal to the quantity $T_{max}-(T_{max}-T_{min})/7$. If it is, a transfer is made to step 76 in which a display (representatively 6 bars) is created in the display area 62 (see FIG. 1) indicative of essentially full hot water availability from the water heater 12. A query is then made at step 78 as to whether $T_{meas}$ is greater then $T_{max}$ (the original setpoint temperature of the water heater 12). If it is, $T_{max}$ is reset to $T_{meas}$ at step 80, and the program returns to the start step 72 via the "return to start" step 82 shown in FIG. 2C. If the answer to the indicated query at step 78 is negative, the program returns to the start step 72 directly from the step 78 via step 82. If the answer to the indicated query at step 74 is negative the program transfers from step 74 to step 84.

At step 84 a query is made as to whether $T_{meas}$ is within the range from the quantity $T_{max}-2(T_{max}-T_{min})/7$ to the quantity $T_{max}-(T_{max}-T_{min})/7$. If it is, a transfer is made to step 86 in which a display (representatively five bars) is created in the display area 62 indicative of an incrementally reduced hot water availability from the water heater 12 compared to the display created in step 76 and the program transfers to the start step 72 via step 82. If $T_{meas}$ is not within the step 84 range, the program transfers to step 88.

At step 88 a query is made as to whether $T_{meas}$ is within the range from the quantity $T_{max}-3(T_{max}-T_{min})/7$ to the quantity $T_{max}-2(T_{max}-T_{min})/7$. If it is, a transfer is made to step 90 in which a display (representatively four bars) is created in the display area 62 indicative of an incrementally reduced hot water availability from the water heater 12 compared to the display created in step 86 and the program transfers to the start step 72 via step 82. If $T_{meas}$ is not within the step 88 range, the program transfers to step 92 (see FIG. 2B).

At step 92 a query is made as to whether $T_{meas}$ is within the range from the quantity $T_{max}-4(T_{max}-T_{min})/7$ to the quantity $T_{max}-3(T_{max}-T_{min})/7$. If it is, a transfer is made to step 94 in which a display (representatively three bars) is created in the display area 62 indicative of an incrementally reduced hot water availability from the water heater 12 compared to the display created in step 90 and the program transfers to the start step 72 via step 82. If $T_{meas}$ is not within the step 92 range, the program transfers to step 96.

At step 96 a query is made as to whether $T_{meas}$ is within the range from the qantity $T_{max}-5(T_{max}-T_{min})/7$ to the quantity $T_{max}-4(T_{max}-T_{min})/7$. If it is, a transfer is made to step 98 in which a display (representatively two bars) is created in the display area 62 indicative of an incrementally reduced hot water availability from the water heater 12 compared to the display created in step 94 and the program transfers to the start step 72 via step 82. If $T_{meas}$ is not within the step 96 range, the program transfers to step 100.

At step 100 a query is made as to whether $T_{meas}$ is within the range from the quantity $T_{max}-6(T_{max}-T_{min})/7$ to the quantity $T_{max}-5(T_{max}-T_{min})/7$. If it is, a transfer is made to step 102 in which a display (representatively one bar) is created in the display area 62 indicative of an incrementally reduced hot water availability from the water heater 12 compared to the display created in step 98 and the program transfers to the start step 72 via step 82. If $T_{meas}$ is not within the step 100 range, the program transfers to step 104 (see FIG. 2C).

At step 104 a query is made as to whether $T_{meas}$ is less than or equal to $T_{min}$. If it is, a transfer is made to step 106 in which the display area is reduced to a blank state indicating that the water heater 12 is out of hot water and the program transfers to the start step 72 via step 82. If $T_{meas}$ is not less than or equal to $T_{min}$, the program similarly transfers to the start step 72 via step 82.

It can be seen in the flow chart collectively shown in FIGS. 2A-2C that as $T_{meas}$ respectively falls within the algorithm ranges in steps 74, 84, 88, 92, 96, 100 and 104 it progressively decreases and is thus correlated to the decreasing number of bars respectively made visible to a user of the water heater 12 in the display steps 76, 86, 90, 94, 98 and 102. As can further be seen in this flow chart, this useful display of the variable hot water availability for the water heater 12 is achieved using only temperature parameters—illustratively, the sensed tank water temperature $T_{meas}$, a predetermined hot water set point temperature $T_{max}$, and a predetermined minimum tank water temperature $T_{min}$.

While a visual display has been representatively described as being utilized as a signal to a user indicating the approximate hot water availability of the water heater 12 at any given time, it will be readily appreciated by those of skill in this particular art that other types of signals, including audible signals and other types of visual signals, could be utilized if desired without departing from principles of the present invention. Moreover, algorithms other than the one collectively shown in decisional steps 74, 84, 88, 92, 96, 100 and 104 could be alternatively utilized if desired, and a greater or lesser of such decisional steps could also be alternatively utilized, without departing from principles of the present invention.

Water Heater Recovery Time Diagnostic Program

Figure 3A:
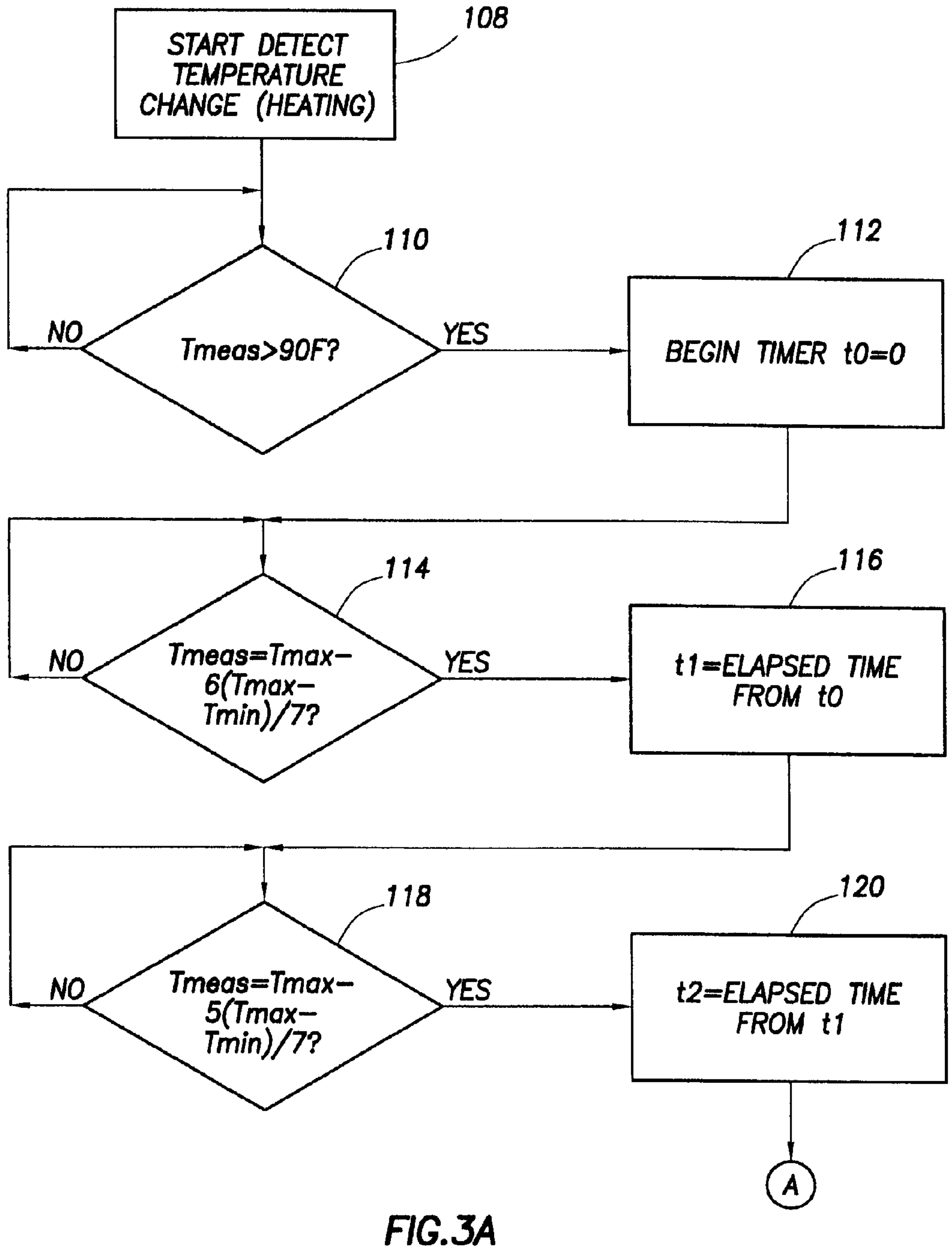
FIGS. 3A-3C collectively form a schematic flow diagram illustrating a method of measuring and storing the magnitudes of initial water heater recovery time increments performable by the monitor/diagnostic display apparatus.
Figure 3B:
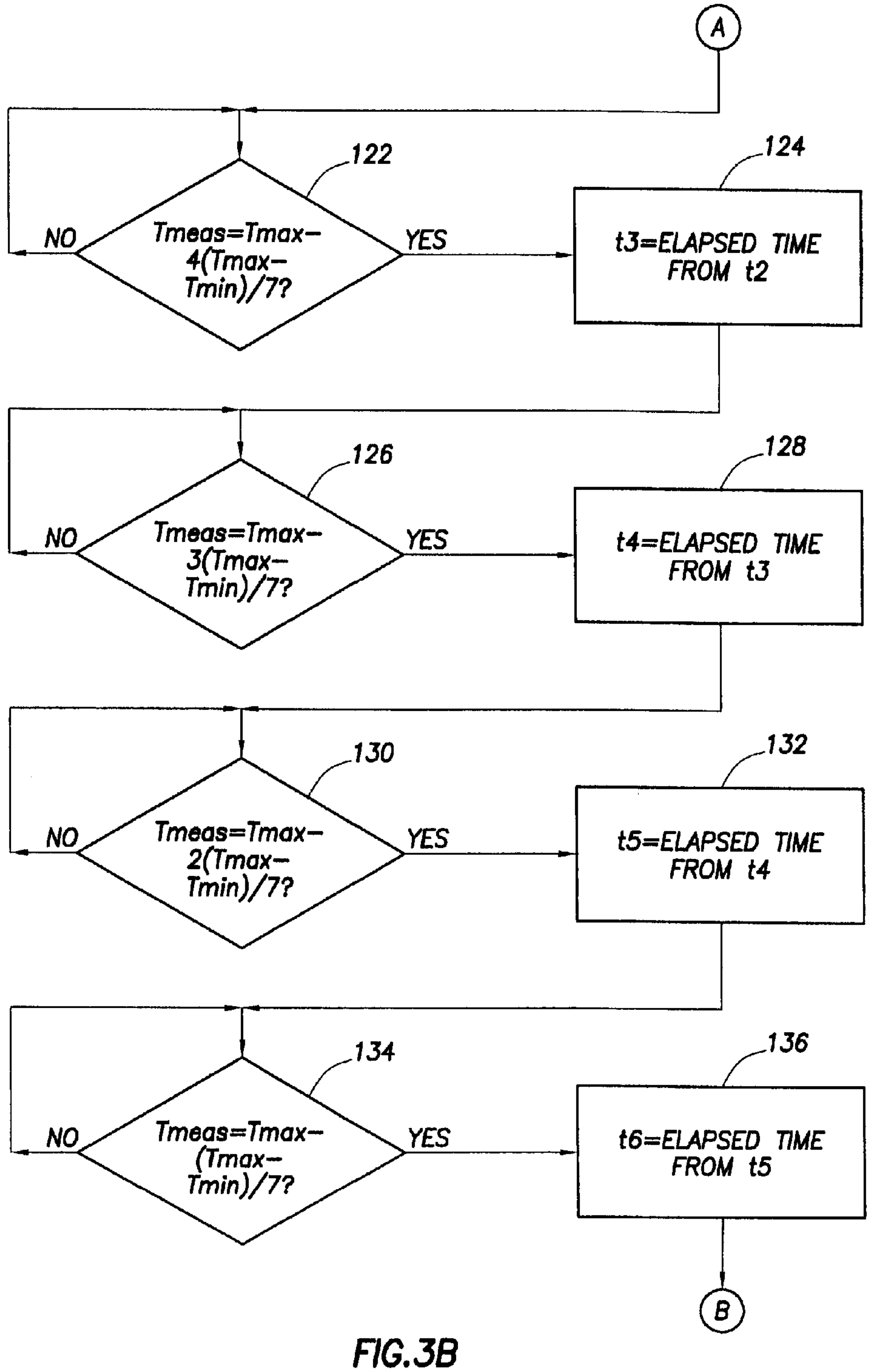
Figure 3C:
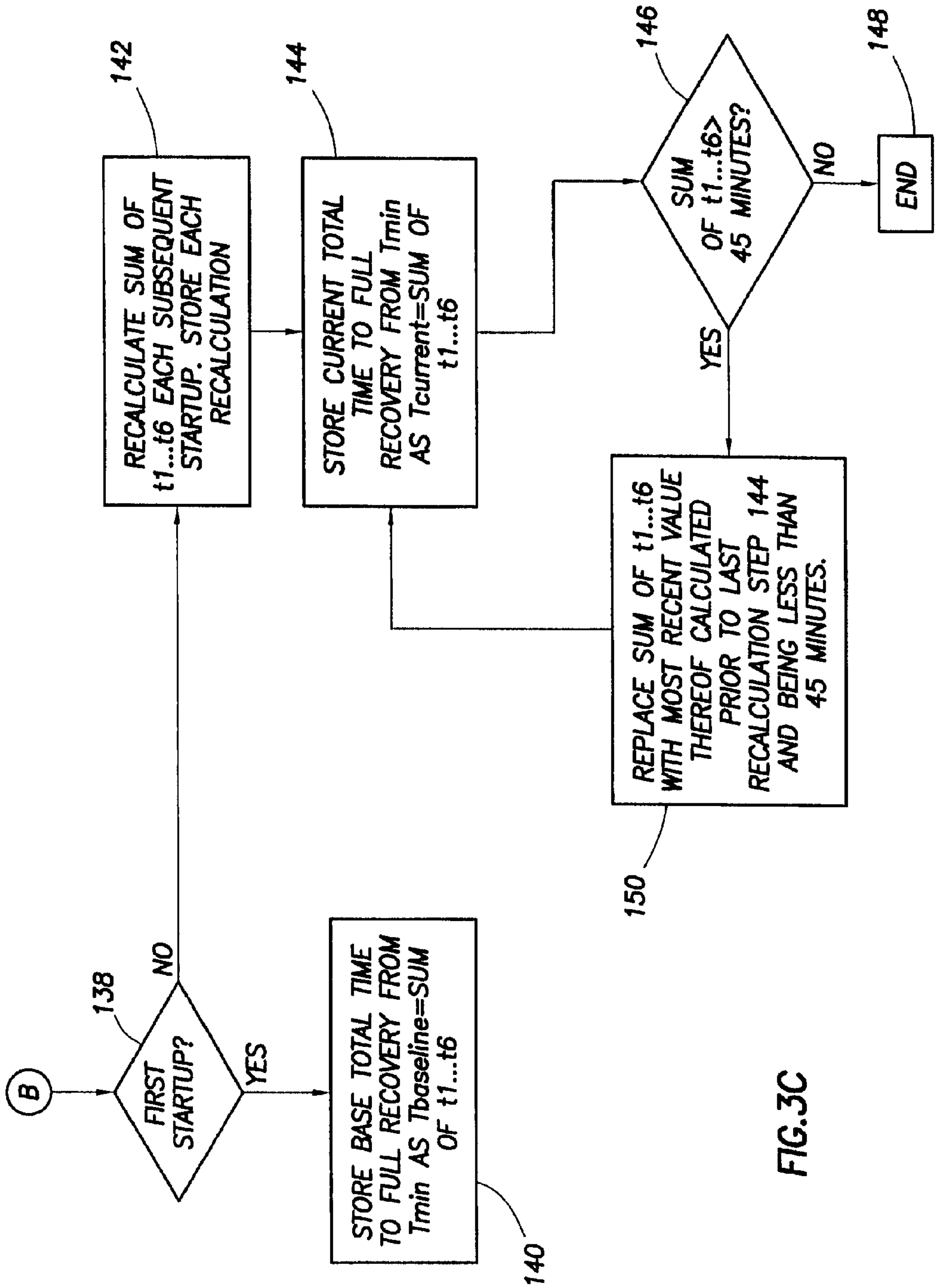

FIGS. 3A-3C collectively form a schematic flow diagram illustrating the measuring and storing the magnitudes of initial water heater recovery time increments performable by the monitor/diagnostic display apparatus 10 in preparation for generating displays indicative of estimated water heater recovery times to a state of full available hot water, and for water heater efficiency diagnostic purposes, as subsequently described herein. The circled match point "A" in the FIG. 3A flow diagram segment corresponds to the circled match point "A" in the FIG. 3B flow diagram segment, and the circled match point "B" in the FIG. 3B flow diagram segment corresponds to the circled match point "B" in the FIG. 3C flow diagram segment.

Referring initially to FIG. 3A, this preparatory program is initiated, at start step 108, in response to the detection by monitoring/transceiver device 50 of an initial heating of the stored tank water 16 from $T_{min}$ (representatively 90° F.). Such initial heating of the tank water 16 may occur at the initial startup of the water heater 12, or subsequent heat-up from the predetermined water temperature $T_{min}$. In response to start-up at step 108, a query is made at step 110 as to whether the detected water temperature $T_{meas}$ is greater than 90° F. If it is not, the program loops through step 110 until its $T_{meas}$ test is met. If it a transfer is made to step 112 in which the microprocessor clock portion 60 (see FIG. 1) is started at time $t_o=0$.

Next, at step 114 a query is made as to whether $T_{meas}$ is equal to $T_{max}-6(T_{max}-T_{min})/7$. If it is not, the program loops through step 114 until its $T_{meas}$ test is met. If it is, at step 116 a value of the elapsed time from $t_o$ is stored as $t_1$.

Next, at step 118 a query is made as to whether $T_{meas}$ is equal to $T_{max}-5(T_{max}-T_{min})/7$. If it is not, the program loops through step 118 until its $T_{meas}$ test is met. If it is, at step 120 a value of the elapsed time from $t_1$ is stored as $t_2$.

Next, with reference now to FIG. 3B, at step 122 a query is made as to whether $T_{meas}$ is equal to $T_{max}-4(T_{max}-T_{min})/7$. If it is not, the program loops through step 122 until its $T_{meas}$ test is met. If it is, at step 124 a value of the elapsed time from $t_2$ is stored as $t_3$.

Next, at step 126 a query is made as to whether $T_{meas}$ is equal to $T_{max}-3(T_{max}-T_{min})/7$. If it is not, the program loops through step 126 until its $T_{meas}$ test is met. If it is, at step 128 a value of the elapsed time from $t_3$ is stored as $t_4$.

Next, at step 130 a query is made as to whether $T_{meas}$ is equal to $T_{max}-2(T_{max}-T_{min})/7$. If it is not, the program loops through step 130 until its $T_{meas}$ test is met. If it is, at step 132 a value of the elapsed time from $t_4$ is stored as $t_5$.

Next, at step 134 a query is made as to whether $T_{meas}$ is equal to $T_{max}-(T_{max}-T_{min})/7$. If it is not, the program loops through step 134 until its $T_{meas}$ test is met. If it is, at step 136 a value of the elapsed time from $t_5$ is stored as $t_6$. In this manner, subsequent to start-up a representative six recovery startup time intervals $t_1$-$t_6$ are stored for subsequent use.

With reference now to FIG. 3C, after the recovery time increments $t_1$ through $t_6$ have been determined and stored as described above, a query is made at step 138 as to whether the detected heating startup was the first startup for the water heater 12. If it was, at step 140 the program stores the base total time to full recovery (i.e., to the predetermined $T_{max}$) from $T_{min}$ as $t_{baseline}$=the sum of the six time increments $t_1$ through $t_6$. If the startup was not the first startup of the water heater 12, a transfer is made to step 142 which recalculates and stores the sum of the subsequent startup recovery time intervals $t_1$ through $t_6$, and also stores each previously calculated sum thereof.

Next, at step 144, the program stores the current (i.e., most recent) total time to full recovery from $T_{min}$ as $t_{current}$=the sum of the just-calculated sum of $t_1$ through $t_6$. At step 146 a query is then made as to whether the sum of the time intervals $t_1$ through $t_6$ is greater than a predetermined time—representatively 45 minutes (or some other suitable predetermined time period to suit the particular installation or application)—which would be indicative of an abnormally long total water heater recovery time period that would occur if, for example, hot water was being drawn from the water heater during recovery thereof.

If this time interval sum is not greater than 45 minutes the program is ended at step 148. If it is greater than 45 minutes, step 150 replaces the sum of $t_1$ through $t_6$ used in step 144 with the most recent value of such sum calculated prior to the recalculation step 144 and being less than 45 minutes. This substituted sum could be one of the sums calculated and stored in step 142 or the $t_{baseline}$ sum stored in step 140.

Figure 4A:
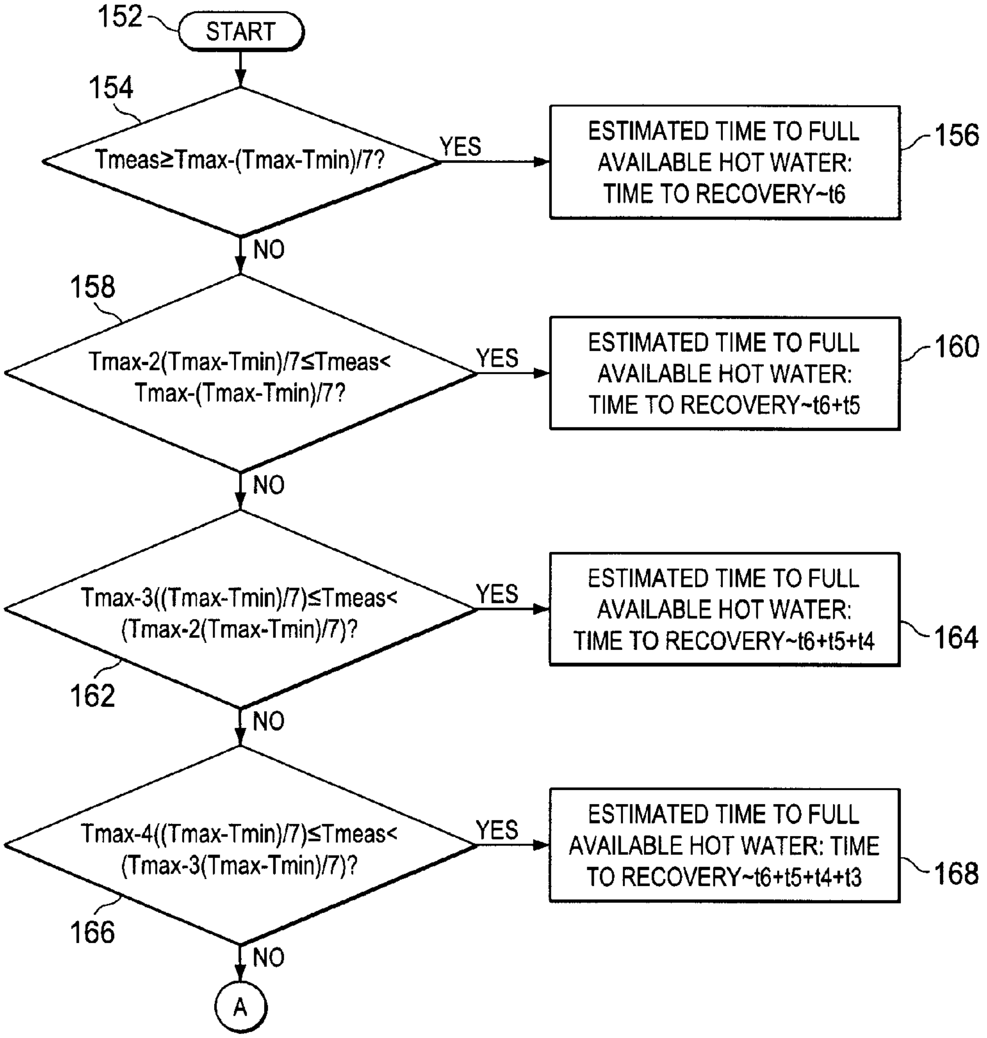
FIGS. 4A-4B collectively form a schematic flow diagram illustrating a method, performable by the monitor/diagnostic display apparatus, of utilizing the stored recovery time increments, together with various measured and predetermined water temperatures, to display estimated times to full hot water availability for the water heater.
Figure 4B:
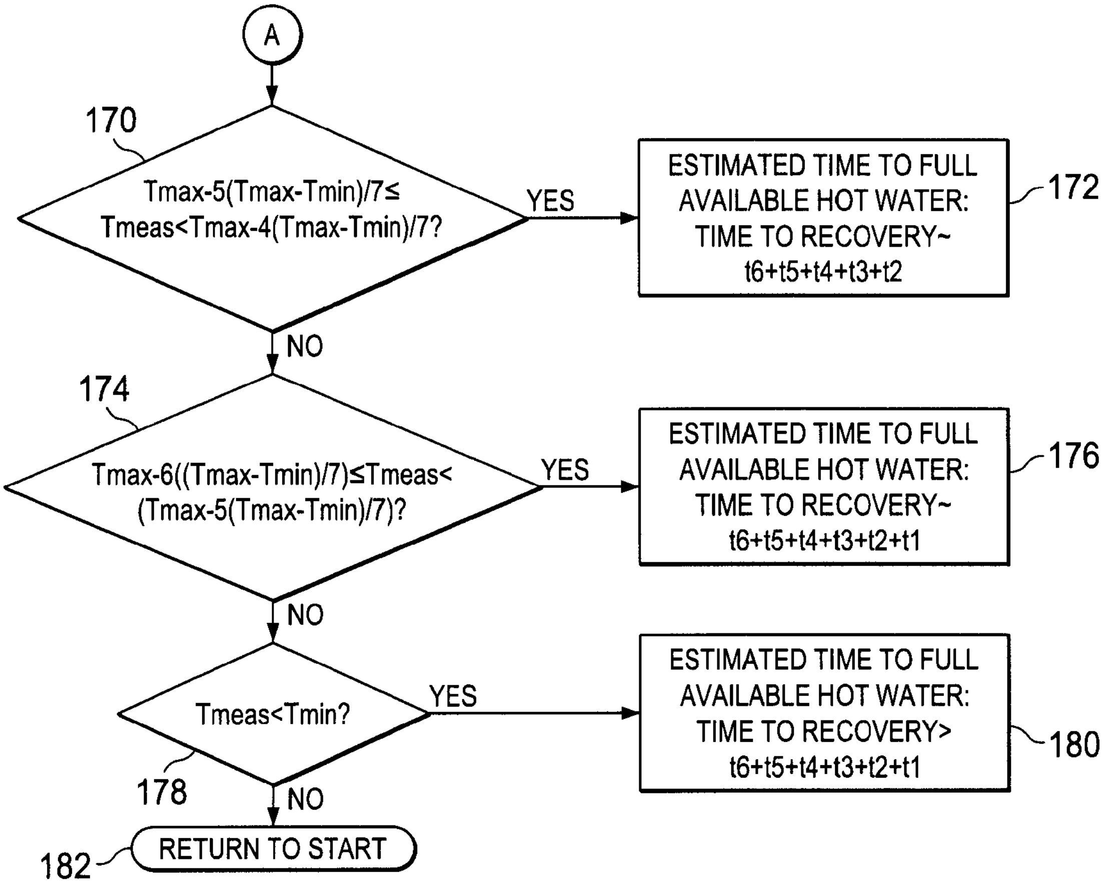

FIGS. 4A-4B collectively form a schematic flow diagram illustrating the determining and displaying by the display/control device or diagnostic device 52 of estimated times for the water heater 12 (see FIG. 1) to recover to its set point temperature $T_{max}$ from a given lesser water temperature $T_{meas}$, utilizing stored values of the recovery time intervals $t_1$ through $t_6$ created via the steps previously described in conjunction with FIGS. 3A-3C. The circled match point "A" in the FIG. 4A flow diagram segment corresponds with the circled match point "A" in the FIG. 4B flow diagram segment.

Referring initially to FIG. 4A, in response to being started at step 152 (by, for example, pressing one of the control buttons 64 shown in FIG. 1), such estimated recovery time diagnostic program transfers to step 154 in which a query is made as to whether $T_{meas}$ is greater or equal to the quantity $T_{max}-(T_{max}-T_{min})/7$. If it is, at step 156 a user-observable message is generated in the display area 62 (see FIG. 1) that the estimated time to recovery (i.e., with full hot water availability at the water heater 12) is approximately the time in the previously stored time interval $t_6$. If the step 154 $T_{meas}$ magnitude test is not met, the program transfers to step 158.

At step 158 a query is made as to whether $T_{meas}$ is within the indicated range of from $T_{max}-2(T_{max}-T_{min})/7$ to $T_{max}-(T_{max}-T_{min})/7$. If it is, at step 160 a user-observable message is generated in the display area 62 that the estimated time to full water heater recovery is approximately the sum of the times in the previously stored time intervals $t_6$ and $t_5$. If the step 158 $T_{meas}$ magnitude test is not met, the program transfers to step 162.

At step 162 a query is made as to whether $T_{meas}$ is within the indicated range of from $T_{max}-3(T_{max}-T_{min})/7$ to $T_{max}-2(T_{max}-T_{min})/7$. If it is, at step 164 a user-observable message is generated in the display area 62 that the estimated time to full water heater recovery is approximately the sum of the times in the previously stored time intervals $t_6$, $t_5$ and $t_4$. If the step 162 $T_{meas}$ magnitude test is not met, the program transfers to step 166.

At step 166 a query is made as to whether $T_{meas}$ is within the indicated range of from $T_{max}-4(T_{max}-T_{min})/7$ to $T_{max}-3(T_{max}-T_{min})/7$. If it is, at step 168 a user-observable message is generated in the display area 62 that the estimated time to full water heater recovery is approximately the sum of the times in the previously stored time intervals $t_6$, $t_5$, $t_4$ and $t_3$. If the step 166 $T_{meas}$ magnitude test is not met, the program transfers to step 170 (see FIG. 4B).

At step 170 a query is made as to whether $T_{meas}$ is within the indicated range of from $T_{max}-5(T_{max}-T_{min})/7$ to $T_{max}-4(T_{max}-T_{min})/7$. If it is, at step 172 a user-observable message is generated in the display area 62 that the estimated time to full water heater recovery is approximately the sum of the times in the previously stored time intervals $t_6$, $t_5$, $t_4$, $t_3$ and $t_2$. If the step 170 $T_{meas}$ magnitude test is not met, the program transfers to step 174.

At step 174 a query is made as to whether $T_{meas}$ is within the indicated range of from $T_{max}-6(T_{max}-T_{min})/7$ to $T_{max}-5(T_{max}-T_{min})/7$. If it is, at step 176 a user-observable message is generated in the display area 62 that the estimated time to full water heater recovery is approximately the sum of the times in the previously stored time intervals $t_6$, $t_5$, $t_4$, $t_3$, $t_2$ and $t_1$. If the step 174 $T_{meas}$ magnitude test is not met, the program transfers to step 178.

At step 178 a query is made as to whether $T_{meas}$ is less than $T_{min}$. If it is, at step 180 a user-observable message is generated in the display area 62 that the estimated time to full water heater recovery is greater than the sum of the times in the previously stored time intervals $t_6$, $t_5$, $t_4$, $t_3$, $t_2$ and $t_1$. If the step 178 $T_{meas}$ magnitude test is not met, the program returns to the start step 152 via the return to start step 182.

As can be seen, this program provides a user of the water heater 12 with the desirable ability to rapidly and easily determine the approximate full recovery time for the water heater from any given tank water temperature $T_{meas}$.

Water Heater Service Alert Diagnostic Program

The monitor/diagnostic display apparatus 10 also provides a user of the water heater 12 with the ability to quickly determine if, over time, the efficiency of the water heater 12 has diminished to the point that inspection and servicing of the water heater should be obtained. A diagnostic program providing a user of the water heater with this service diagnostic ability is shown in the schematic flow chart of FIG. 5.

Figure 5:
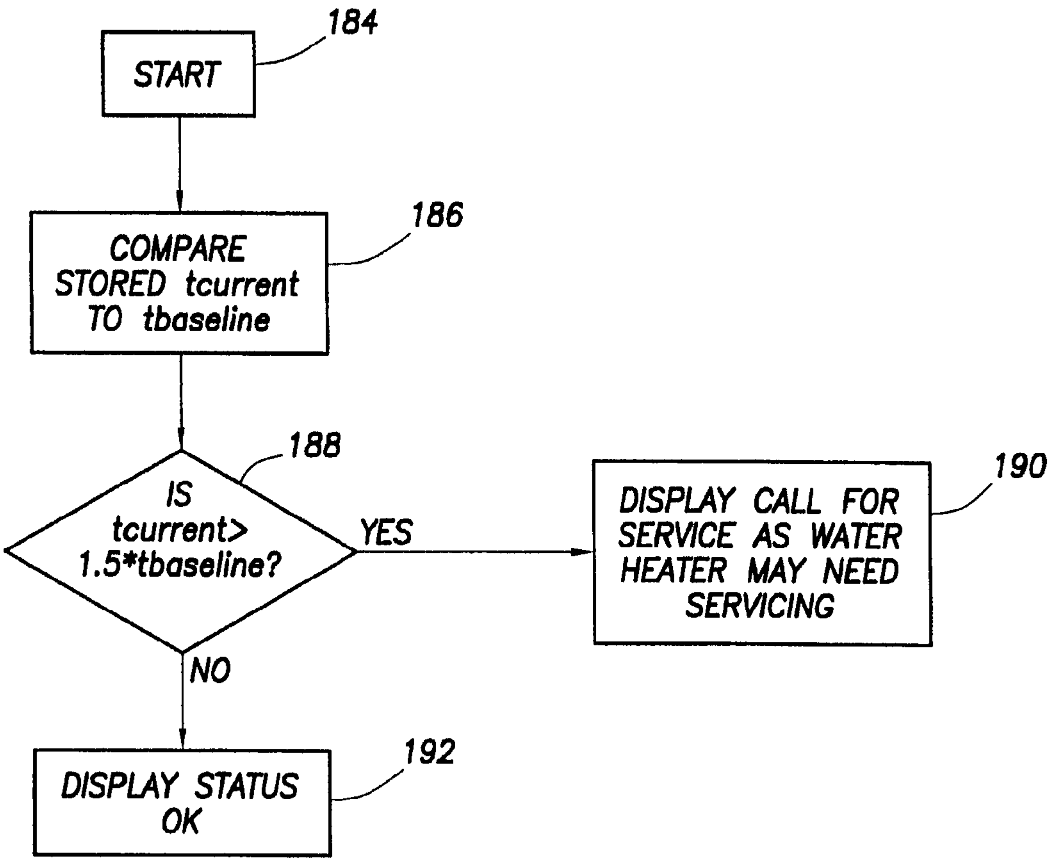
FIG. 5 is a schematic flow diagram illustrating a method of periodically testing the overall water heater efficiency performable by the monitor/diagnostic display apparatus.

This diagnostic program is started, at step 184 in FIG. 5, by simply depressing an appropriate one of the control buttons 64 (see FIG. 1). Responsive to this startup, at step 186 a comparison is made between the magnitude of the previously stored $t_{current}$ (see step 144 in FIG. 3C) and the magnitude of the previously stored $t_{baseline}$. At step 188 a query is then made as to whether $t_{current}$ is greater than $t_{baseline}$ by a predetermined factor—representatively 1.5. If it is, a transfer is made to step 190 in which a message is generated on the display 62 to the effect that the water heater may need servicing (due to its large loss in efficiency over time). If it is not, a transfer is made to step 192 in which a message is generated on the display 62 to the effect that the water heater does not need servicing at this time due to diminished efficiency thereof. In a suitable conventional manner the displays in steps 190,192 may be turned off after either message is provided to the water heater user.

Figure 6:
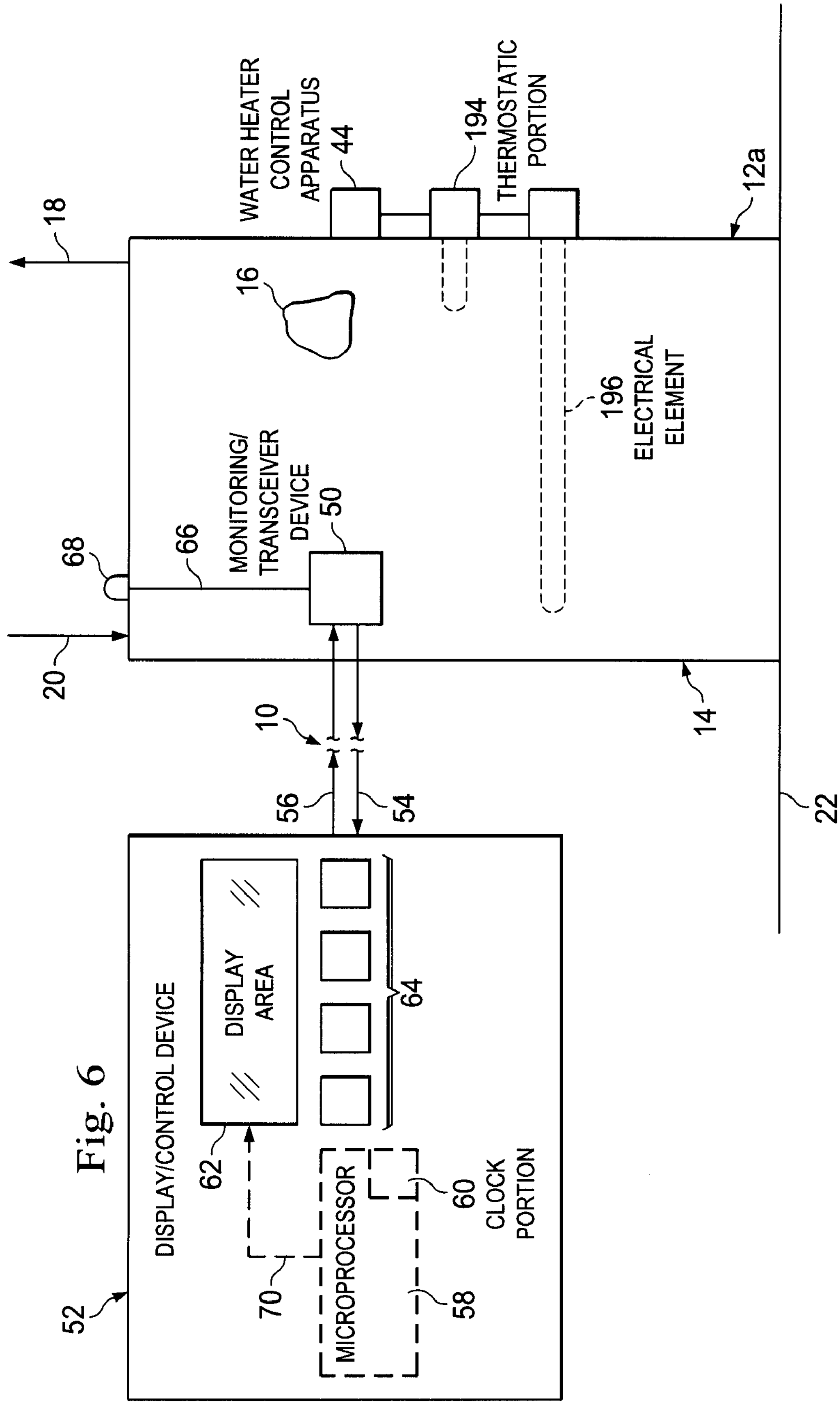
FIG. 6 schematically depicts an electric version of the FIG. 1 water heater.

Thus far the various diagnostic and display capabilities or the apparatus 10 have been described as being utilized in conjunction with the representatively fuel-fired water heater 12. However, as will be readily appreciated by those of skill in this particular art, the monitor/diagnostic display apparatus 10 could alternatively be utilized in conjunction with an electric water such as the electric water heater 12*a* schematically depicted in FIG. 6. Like its fuel-fired counterpart shown in FIG. 1, the electric water heater 12*a* has a tank 14 in which pressurized heated water 16 is stored for on-demand delivery through the supply line 18, and has a schematically illustrated main control 44. However, instead of fuel-fired heating apparatus (i.e., burners, a combustion chamber and a flue pipe), the representative electric water heater 12*a* has conventional water heating apparatus in the form of a thermostatic portion 194 that controls the operation of at least one submersible resistance type electrical element 196 projecting into the water-filled interior of the tank 14.

The foregoing detailed description is to be clearly understood as being given by way of illustration and example only, the spirit and scope of the present invention being limited solely by the appended claims.

What is claimed is:

1. For use with a water heater in which heated water is stored for on-demand delivery therefrom, the water heater having a predetermined heated water setpoint temperature $T_{max}$ and a predetermined minimum water temperature $T_{min}$, monitor/diagnostic apparatus comprising:

a monitoring portion operable to detect the temperature $T_{meas}$ of the stored water and responsively generate an output signal indicative of its magnitude; and a diagnostic portion operable to:

(1) determine successive time periods, during heating of the stored water from $T_{min}$ to $T_{max}$, required to respectively heat the stored water from each of a series of progressively lower temperatures to the next higher temperature in said series thereof, and then (2) utilize said output signal, and the total magnitude(s) of an associated one or more of the determined successive time periods, to generate a diagnostic signal indicating to a user an estimated time for the water heater to recover from $T_{meas}$ to $T_{max}$.

2. The monitor/diagnostic apparatus of claim 1 wherein: the magnitude of said estimated recovery time signal is a predetermined function of $T_{meas}$, $T_{max}$, $T_{min}$ and the total time of one or more of the determined successive time periods.

3. The monitor/diagnostic apparatus of claim 1 wherein: said estimated recovery time signal is a visual display.

4. The monitor/diagnostic apparatus of claim 1 wherein: said monitoring portion is mountable on the water heater.

5. The monitor/diagnostic apparatus of claim 1 wherein: said diagnostic portion is mountable on the water heater.

6. The monitor/diagnostic apparatus of claim 1 wherein: said diagnostic portion is mountable remotely from the water heater.

7. The monitor/diagnostic apparatus of claim 1 wherein: said monitoring portion and said diagnostic portion are operative to communicate with one another via a wired connection.

8. The monitor/diagnostic apparatus of claim 1 wherein: said monitoring portion and said diagnostic portion are operative to wirelessly communicate with one another.

9. The monitor/diagnostic apparatus of claim 1 wherein: said diagnostic portion is operable to disregard the determined successive time periods, and utilize a set of previously determined successive time periods, if the total of their time exceeds a predetermined total time.

10. The monitor/diagnostic apparatus of claim 1 wherein: the magnitude of said estimated recovery time signal is related in a predetermined manner to $T_{meas}$, $T_{max}$, and $T_{min}$.

11. The monitor/diagnostic apparatus of claim 10 wherein: the magnitude of said estimated recovery time signal is incrementally varied as a function of predetermined incremental relationships between (1) $T_{meas}$ and (2) $T_{max}$ and $T_{min}$.

12. Water heating apparatus comprising:

a water heater operative to heat water stored therein for on-demand delivery therefrom, the water heater having a predetermined heated water setpoint temperature $T_{max}$ and a predetermined minimum water temperature $T_{min}$; and monitor/diagnostic apparatus operatively associated with said water heater and having:

a monitoring portion operable to detect the temperature $T_{meas}$ of the stored water and responsively generate an output signal indicative of its magnitude; and a diagnostic portion operable to:

(1) determine successive time periods, during heating of the stored water from $T_{min}$ to $T_{max}$, required to respectively heat the stored water from each of a series of progressively lower temperatures to the next higher temperature in said series thereof, and then (2) utilize said output signal, and the total magnitude(s) of an associated one or more of the determined successive time periods, to generate a diagnostic signal indicating to a user an estimated time for the water heater to recover from $T_{meas}$ to $T_{max}$.

13. The water heating apparatus of claim 12 wherein: said water heater is a fuel-fired water heater.

14. The water heating apparatus of claim 12 wherein: said water heater is an electric water heater.

15. The water heating apparatus of claim 12 wherein: said diagnostic signal is a visual display.

16. The water heating apparatus of claim 12 wherein: the magnitude of said diagnostic signal is related in a predetermined manner to $T_{meas}$, $T_{max}$, and $T_{min}$.

17. The water heating apparatus of claim 12 wherein: the magnitude of said diagnostic signal is incrementally varied as a function of predetermined incremental relationships between (1) $T_{meas}$ and (2) $T_{max}$ and $T_{min}$.

18. The water heating apparatus of claim 12 wherein: said diagnostic portion is operable to disregard the determined successive time periods, and utilize a set of previously determined successive time periods, if the total of their time exceeds a predetermined total time.

* * * * *